Nov. 18, 1958 W. KOBER 2,861,205
ROTORS FOR AXIAL AIR GAP DYNAMOELECTRIC MACHINES
Filed April 8, 1954 2 Sheets-Sheet 1

INVENTOR.
WILLIAM KOBER
BY
Bean, Brooks, Buckley & Bean.
ATTORNEYS

Nov. 18, 1958 W. KOBER 2,861,205
ROTORS FOR AXIAL AIR GAP DYNAMOELECTRIC MACHINES
Filed April 8, 1954 2 Sheets-Sheet 2

INVENTOR.
WILLIAM KOBER
BY
Bean, Brooks, Buckley & Bean.
ATTORNEYS

United States Patent Office 2,861,205
Patented Nov. 18, 1958

2,861,205

ROTORS FOR AXIAL AIR GAP DYNAMO-ELECTRIC MACHINES

William Kober, Fairport, N. Y., assignor to TKM Electric Corp., Rochester, N. Y.

Application April 8, 1954, Serial No. 421,935

10 Claims. (Cl. 310—156)

This invention relates generally to the dynamo electric machinery art, and more specifically to a new and useful pole piece supporting method and arrangement particularly adapted for axial air gap machines having a rotating permanent magnet field structure. This application is a continuation-in-part of my pending application Ser. No. 216,185 now Patent No. 2,719,931.

Conventional dynamo electric machines comprise a rotor surrounded by a stator to provide a radial air gap therebetween. While such a construction is satisfactory in many instances, as in electromagnetic generators for example, it does not lend itself to optimum utilization of permanent magnets. For example, it is difficult to provide proper magnet length and protecting structures without disturbing an efficient relation between pole pitch and axial length. Also, the magnets, protecting structures and pole pieces tend to slide radially outwardly and there must be provided fastening devices of sufficient strength to hold them in place against inertial forces.

Accordingly, I have developed and disclosed in my copending application Ser. No. 216,185, a rotating permanent magnet field generator of axial air gap construction wherein the stator is spaced from an end face of a cylindrical rotor, and wherein the air gap area per pole is unrelated to magnet length permitting optimum design of the air gap area and optimum magnet length. The advantages of my axial air gap construction are fully set forth in said application.

The few prior art dynamo electric machines utilizing permanent magnets in an axial air gap construction of which I am aware are very crude and simple devices designed for low speed operation. They contain no appreciation of the requirements for proper and efficient utilization of permanent magnets, and have not even attempted, in many cases, to provide pole pieces. However, the importance of pole pieces for any degree of high performance cannot be overemphasized. For example, they have a capping function in keeping the magnet faces unipotential and in preventing surface demagnetization. They serve to control the waveform and reduce stator losses by their shape, they assist in achieving the proper air gap area, and they serve as dampening means in single phase machines. They also retain the magnet state when free and provide a short circuit flux leakage path, and they prevent losses due to stator tufting. Therefore, good performance requires pole pieces.

The securing or fastening of pole pieces in axial air gap machines presents a considerable problem because a very high degree of mechanical strength is required. For example, I contemplate an axial air gap generator developing 1.8 kw. at 40,000 R. P. M., and having a breaking point at about 100,000 R. P. M. Screws, pins, rivets and other such fastening means generally do not possess the mechanical strength required to overcome the centrifugal force developed on the pole pieces at such speeds of rotation, and would require an unusually large size and/or number thereof, or additional supporting structures, which would result in a relatively cumbersome, expensive and otherwise undesirable arrangement.

I also disclose in my earlier application a pole piece supporting arrangement which is eminently suitable in many respects. However, it possesses certain disadvantages in that it is relatively expensive and is not of the required strength for many installations.

Accordingly, it is a primary object of this invention to provide, in an axial air gap machine, a practical rotor pole piece supporting arrangement which is relatively simple and inexpensive in design, easy to fabricate and assemble, and which possesses a high degree of mechanical strength enabling high speed operation and optimum design and performance.

A rotor construction in accord with my invention is broadly characterized by the provision of a rotor body having on its air gap end face, an extension formed integral therewith to bear against and preferably overlie the outer edge of one or more pole pieces, together with means bearing against and preferably overlying the inner edge of the pole piece or pieces, to hold the same against the rotor body and against movement radially outwardly by the force of rotation.

In another aspect thereof, my invention is characterized by a novel method of making the rotor including forming a rotor body, preferably of cylindrical form, with an air gap end face extension integral therewith and preferably in the form of an undercut annular lip for receiving the outer edge portion of the pole pieces.

The foregoing and other objects and advantages will become readily apparent from the ensuing detailed description, taken together with the accompanying drawing wherein.

Figure 1:
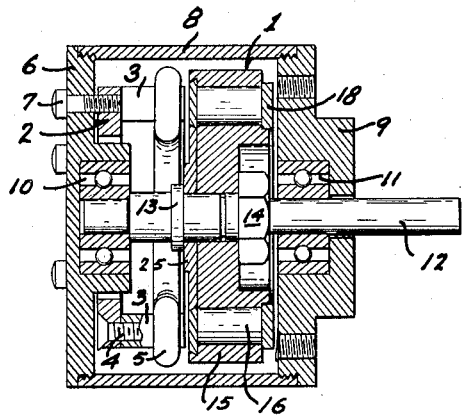
Fig. 1 is a longitudinal sectional view through a generator having a rotating permanent magnet field of my design wherein the pole pieces are supported in accord with my invention.
Figure 2:
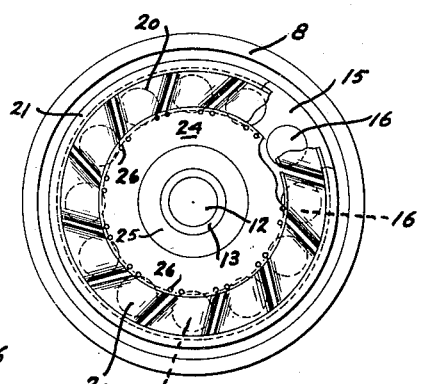
Fig. 2 is a view in end elevation of the air gap face of the rotor of Fig. 1, with parts broken away for greater clarity.
Figure 3:
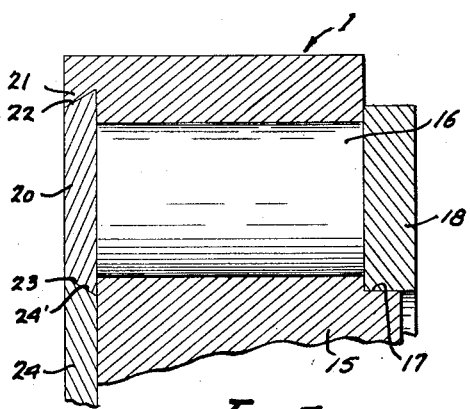
Fig. 3 is a fragmentary detail view, partly in section, showing the manner in which the pole pieces are held in place against the magnet faces.

Referring first to the embodiment of Figs. 1, 2 and 3, which show a pole piece supporting arrangement according to my invention incorporated into a permanent magnet field structure similar to that illustrated and disclosed in detail in my said copending application, there is shown a rotor generally designated 1 and a stator generally designated 2 mounted in axially spaced relation to provide an axial air gap therebetween with the rotor pole pieces lying on a substantially flat end surface facing the flat end surface of the stator.

The stator is of a conventional design forming no part per se of the instant invention and can comprise, for example, a main body portion and multiple teeth 3 secured to the main body portion as by screws 4, together with a winding 5 in the slots provided between teeth 3. The stator is connected to one end 6 of the machine casing, as by bolts 7, and it will be noted that the casing end 6 is adapted for threading into a cylindrical sleeve 8. A second casing end 9 threads into the opposite end of the casing sleeve.

The casing ends 6 and 9 are provided with bearing structures generally designated 10 and 11, respectively, for rotatably journaling a drive shaft 12, the arrangement being such that the casing end 6 can be unscrewed from the sleeve 8 for removal of the stator 3, and casing end 9 can be unscrewed from the sleeve 8 to enable the shaft 12 and rotor 1 to be withdrawn from the casing, whereby to provide a readily assembled and disassembled construction which facilitates inspection and repair.

The rotor 1 bears at one end thereof against a flange 13 on shaft 12, and is held in place thereagainst as by means of a nut 14 received in a recess in the opposite end of the rotor body.

As in my copending application, the rotor body comprises a material providing a path of high electrical conductivity and having a high degree of mechanical strength, such as for example wrought Duralumin, in the instant embodiment being formed as a block 15 receiving the shaft 12 therethrough and having holes extending with their axes parallel to the axis of shaft 12 to receive the magnets 16. The block 15 performs several very important functions in that it provides a path of high conductivity encircling the magnets for protecting the magnetic state thereof from overload and short circuit armature reactions and it provides the principal mechanical support for the rotor, retaining the inertia load of the magnets and of its own mass. The material thus provides a heavy-section low resistance conductor and a heavy-section high strength ring around the magnets. Alnico V and other high performance magnet materials usable in the permanent magnets 16 are very weak mechanically and can carry no significant mechanical loads except in direct compression, and it is noted that in a machine of applicant's construction the magnets are fully supported and, when pressed or shrunk into the holes, carry their own weight entirely in compression.

At its end remote from the stator, block 15 is formed with a shoulder 17 defining an annular recess therearound for receiving a back plate 18, which back plate is shrunk onto the block 15 and bears against the rear faces of the magnets 16, as clearly illustrated in Fig. 3, to provide a return circuit or path for the magnetic flux.

As previously noted, this invention is particularly directed to a new and useful pole piece supporting arrangement enabling the utilization of optimum design pole piece structures in high performance axial air gap machines, and in the embodiment of Figs. 1 through 3 such arrangement is as follows. The pole pieces are illustrated at 20 and comprise whatever shape may be required for the particular machine. The block 15 has its air gap face turned or otherwise formed to provide an undercut annular lip 21 extending around the periphery thereof and projecting therefrom in the direction of or across the air gap. The pole pieces 20, which have a flat rear face for bearing directly against the front end faces of the magnets 16, are each provided with a beveled outer edge 22 corresponding to said undercut lip and which is received within or under the lip 21. Thus, as illustrated in Figs. 2 and 3, the pole pieces 20 are fitted over the magnets 16 in proper relation therewith and are fitted under the lip 21 so as to be received therein and held thereby against the front faces of the magnets and the air gap face of the block 15. The inner edges 23 of pole pieces 20 are also beveled and a pole piece retainer plate 24 provided with an undercut periphery 24' corresponding to said beveled inner edges is fitted against and overlies the inner edges 23 of pole pieces 20. Retainer plate 24 is of disc form having a central boss 25, and is slipped onto shaft 12 between block 15 and flange 13, nut 14 being tightened against block 15 to secure said block and plate in position. The air gap face preferably is then machined off so that said face is flat.

With this arrangement wherein the pole pieces are received within the overlying lip 21 on the rotor block and wherein the retainer plate 24 is secured against the rotor block in a position overlying the inner edges of the pole pieces, the pole pieces are securely held against the block 15 and the magnets 16 and are securely positioned radially of block 15. While the main force to be overcome insofar as the positioning of the pole pieces is concerned is the centrifugal force of rotation, it is also essential that the pole pieces be held against lateral displacement, and to this end the lip 24' of plate 24 is pressed inwardly, as at 26, on opposite sides of the pole pieces 20 whereby to bear against and prevent lateral displacement of the pole pieces.

It will be appreciated that this pole piece supporting arrangement is readily fabricated and assembled. The block 15, which is of high mechanical strength, not only supports the magnets and provides a highly conductive path therearound, but it also provides, through its lip 21, the principal mechanical support for the pole pieces and will resist the forces thereon even under high speed operations such as outlined above. Indeed, by this invention there is provided not only a rim of mechanically strong material for resisting outward displacement of the pole pieces, but in addition the lip 21 is itself supported in shear by the material of block 15 immediately therebehind. No fastening devices are required such as might come loose or break off, and it will be appreciated that the pole piece supporting arrangement of this embodiment possesses a high degree of ruggedness such as to be completely reliable while being entirely feasible from a practical viewpoint.

Figure 4:
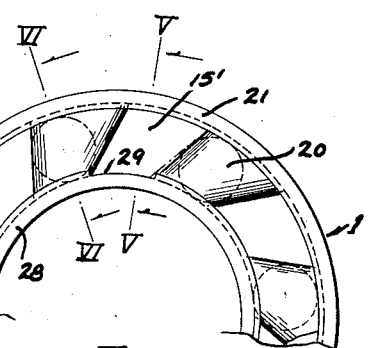
Fig. 4 is a fragmentary view in end elevation similar to Fig. 2, but illustrating a modified supporting arrangement.
Figures 5, 6:
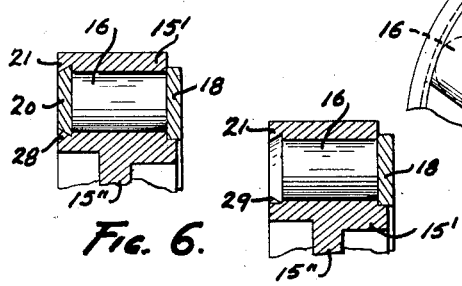
Fig. 5 is a fragmentary detail view, partly in section, taken about on line V—V of Fig. 4.
Fig. 6 is a fragmentary detail view, partly in section, taken about on line VI—VI of Fig. 4.

As an alternative arrangement believed to be more suitable for use with rotors having a relatively large inner diameter, there may be utilized the embodiment of Figs. 4, 5 and 6. In this embodiment the rotor is formed of a block 15' of material similar to block 15, although rather than being solid throughout it can comprise an annular body provided with an interconnecting web as illustrated at 15", the block having holes extending along an axis parallel to the axis of shaft 12 for receiving the magnets 16. Block 15' is formed as described in connection with Fig. 1 to receive the end plate 18 and to provide the undercut peripheral lip 21 for receiving the pole pieces 20. However, rather than using the separate retainer plate 24 for overlying the inner edges of the pole pieces 20, block 15' is provided with a second annular lip 28 formed integrally therewith and spaced radially inwardly from the lip 21 a distance sufficient to accommodate therebetween the pole pieces 20. Lip 28 is undercut similar to lip 21 but in the opposite direction, excepting for one portion where the overhanging lip is cut away to the bottom of its bevel to provide a filler slot 29. Filler slot 29 is of a size sufficient to permit the passage therethrough of the inner edge of the pole pieces 20 and in this embodiment the pole pieces 20 are slipped through the slot 29 into position between the lips 21 and 28, and then around the block 15', sliding under the lips 21 and 28, until they are properly positioned with relation to the magnets 16. The lip 28 is then pressed inwardly on opposite sides of the pole pieces in order to retain the same against lateral displacement. It will be appreciated that lip 21 supports the pole pieces 20 against displacement radially outwardly, in the manner previously described, whereby this embodiment also provides a practical supporting arrangement of high mechanical strength.

As an alternative to pressing the retainer plate 24 of Fig. 1 or the inner retaining lip 28 of Fig. 4 inwardly for securing the pole pieces against lateral displacement, a suitable plastic or other spacing material possessing the requisite mechanical strength can be filled in between the pole pieces 20 after they have been properly positioned. Such spacing means could comprise a wide variety of material, in each case the material being of low magnetic permeability so as not to effect the performance of the machine.

Figure 7:
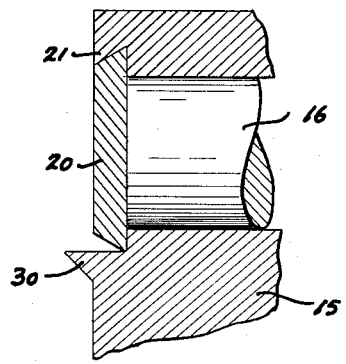
Fig. 7 is a fragmentary sectional view of another embodiment of the invention, at one stage of its assembly.
Figure 8:
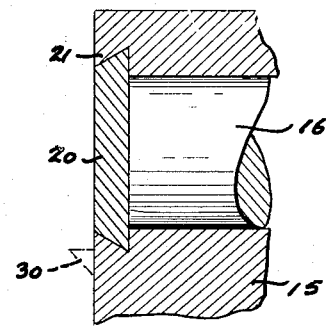
Fig. 8 is a view corresponding to Fig. 7, but showing the same in its final assembled position.

Still another embodiment of the invention, representing an alternative procedure suitable and perhaps preferable in certain circumstances, is illustrated in Figs. 7 and 8. In this embodiment the rotor block 15 is again formed with the outer undercut lip 21, but rather than using the retainer plate 24 or the inner undercut lip 28, block 15 is turned or otherwise formed to provide a pole piece receiving recess or channel in alinement with the magnet holes and is formed to provide an upstanding annular ring 30. The pole piece receiving recess or channel thereby has a flat inner wall permitting insertion of the pole pieces 20 into the channel and under the lip 21. When the pole pieces are properly assembled in their channel with relation to the magnets, the lip 30 is pressed down or in from its broken line position in Fig. 8 to fill in over the inner beveled edges of the pole pieces 20 and to bear against the opposite sides thereof, as illustrated in solid lines in Fig. 8, whereby the pressed lip 30 will overlie the inner edges of the pole pieces to retain the same against the block 15 and will restrain the pole pieces against lateral displacement. It will be observed that this embodiment functions to support the pole pieces in the same manner as the other embodiments, and that the pole pieces are ruggedly supported against displacement under any conditions of high speed and high performance operation.

Figure 10:
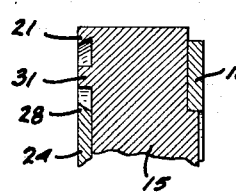
Fig. 10 is a sectional view taken about on line X—X of Fig. 9.
Figure 9:
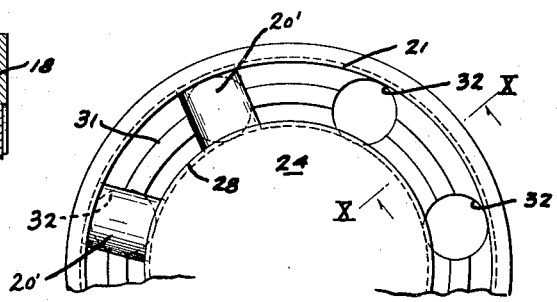
Fig. 9 is a fragmentary view in end elevation of another embodiment of the invention.

A different form of spacing means for preventing lateral displacement of the pole pieces can readily be provided in a supporting arrangement according to this invention, as illustrated in Figs. 9 and 10. In this arrangement the rotor body 15 is milled or turned to provide the pole piece receiving channel and the overhanging outer lip 21, and also to provide an upstanding ridge 31 extending around the block on approximately the magnet centers. The magnet holes 32 are then reamed or bored, which operation removes those portions of the ridge 31 which would be over the magnet holes, leaving only an intermediate ridge portion extending between the adjacent edges of the magnet holes on about the centers thereof. The magnets 16 are then inserted in the holes 32 and the pole pieces 20' are fitted thereover. The plate 24 is then positioned whereby the pole pieces are held against the magnet faces and against radial displacement with the ridge portions 31 retaining the pole pieces against lateral displacement. This arrangement can be used in place of the pressing inwardly of plate 24 or of lip 28 or in place of the separate spacing elements. If the pole pieces extend laterally beyond the magnet faces the ridge portions 31 must be further milled or cut away so as to properly receive and position such pole pieces. Also, with this arrangement the pole pieces cannot be slid around the block 15 under the rim 21, because of the spacing ridge portions 31, and therefore plate 24 or the pressed lip 30 some similar arrangement permitting placement of the pole pieces directly on the magnet faces, as distinguished from the arrangement of Fig. 4, must be used.

If desired, added strength can be imparted to the rotor by placing a reinforcing sleeve therearound or by wrapping the same with reinforcing wire, as disclosed in my pending application, the sleeve or wire serving to reinforce the outer lip 21 and preferably being of steel whereas the rotor body is aluminum or wrought Duralumin.

Accordingly, it will be seen that this invention provides an extremely strong and rugged pole piece supporting arrangement which does not rely on separate fasteners or the like such as might break off or possibly interfere with the proper performance of the machine. This arrangement is eminently suitable for high speed and high performance machines, and is of a simple construction which is readily and inexpensively formed and assembled whereby to provide a highly practical pole piece supporting arrangement in machines of this general type. While I have disclosed the details of various embodiments, it will be appreciated that my invention is not necessarily limited to such details. For example, the rotor body need not be cylindrical nor must the lips 21, 28 and 30 be continuous or annular. The plate 24 need not be disc shaped, and the invention might have utility in machines which do not use permanent magnets. Accordingly, it is intended that this invention be defined only by the appended claims.

Having fully disclosed and completely described my invention, together with its mode of operation, what I claim as new is:

1. In a dynamo electric machine having a rotor and a stator spaced apart along the axis of rotor rotation to provide an axial air gap therebetween, a rotor construction comprising a body member of generally cylindrical form having multiple magnet-receiving holes extending therein generally lengthwise of said axis of rotation, permanent magnets inserted in said holes, a pole piece positioned against the air gap end face of each of said magnets, said pole pieces having outwardly converging inner and outer edges defining generally concentric circles about said axis of rotation, means defining a first generally annular lip formed on said body member adjacent the air gap periphery thereof, said first lip being undercut to overlie said outer pole piece edges, and means providing a second generally annular lip concentric to said first lip secured to said body member, said second lip being undercut to overlie said inner pole piece edges, whereby said pole pieces are held against the air gap end face of said magnets by said first and second lips and by said first lip against displacement radially outwardly from said body member by centrifugal force.

2. The construction set forth in claim 1, together with non-magnetic spacer means between said pole pieces and bearing against the side edge portions thereof to hold said pole pieces against sidewise displacement.

3. In a dynamo electric machine having a stator and a rotor spaced axially therefrom to provide an axial air gap therebetween, a rotor assembly comprising a generally cylindrical body member, shaft means mounting said body member for rotation about its longitudinal axis, a plurality of permanent magnets fitted in said body member and extending generally lengthwise of said axis of rotation, pole pieces fitted over the air gap faces of said magnets, said pole pieces having outwardly converging inner and outer edges defining inner and outer circles concentric with said axis of rotation, said body member having an annular lip integral therewith extending around the outer edge portion of the air gap end face thereof, said lip being undercut to overlie said outer pole piece edges, and a generally circular retainer plate fitted on said shaft means and secured against said body member air gap end face, said retainer plate having its outer edge portion undercut to overlie said inner pole piece edges, whereby said pole pieces are held against said body member air gap end face and against displacement radially outwardly therefrom.

4. The construction set forth in claim 3, wherein the outer edge of said retainer plate is pressed inwardly on opposite sides of said pole pieces to prevent sidewise displacement thereof.

5. In a dynamo electric machine of the axial air gap type, a rotor body member of generally cylindrical form carrying permanent magnet members extending generally lengthwise of the axis of rotation thereof, pole pieces for said magnets, said body member having formed integrally therewith on the air gap end thereof a pair of generally annular extensions concentric with said rotor axis and positioned adjacent the inner and outer ends of said pole pieces, said annular extensions being formed to interlock with said pole pieces and retain the same against said body member and against radial displacement outwardly therefrom, at least one of said extensions being formed to enable insertion of said pole pieces therebetween for assembly on said body member, and means holding the assembled pole pieces against sidewise displacement on said body member.

6. In a dynamo electric machine of the type wherein the stator is opposed to an end face of a generally cylindrical rotor to provide an axial air gap therebetween, a rotor construction comprising a body portion carrying magnets extending generally lengthwise of the rotor axis, said body portion being formed on the air gap end face thereof with a generally annular pole piece receiving channel bounded on one side thereof by an undercut lip integral with said body portion and on the other side thereof by a rim portion integral with said body portion end face, pole pieces having outwardly converging inner and outer edge portions fitted in said channel with said lip overlying one edge of said pole pieces, and said rim portion being pressed over the other edge of said pole pieces, whereby said pole pieces are held against said body portion end face and against radial displacement therefrom.

7. In a dynamo electric machine as set forth in claim 1, upstanding ridge means formed integrally with said body member extending between adjacent side edges of said pole pieces.

8. The method of constructing the rotor in a dynamo electric machine as set forth in claim 1 which comprises, forming a generally cylindrical body member having a plurality of magnet receiving openings therethrough around the axis thereof, forming on an end face of said body member a generally annular pole piece receiving channel aligned with said openings and having undercut side edge portions, forming a pole piece receiving slot in one of said undercut side edge portions, fitting magnets in said openings, inserting through said slot and into said channel pole pieces having inner and outer edge portions substantially complementing said channel side edge portions, and sliding said pole pieces around said channel to their respective magnets.

9. The method of constructing the rotor in an axial air gap dynamo electric machine as set forth in claim 8 which comprises, forming a generally cylindrical rotor body member, forming on an end face thereof a generally annular lip having an undercut inner side, forming an upstanding generally annular ridge concentric with said lip and spaced inwardly therefrom, and forming a plurality of magnet receiving openings through said body member and said upstanding ridge generally lengthwise of the body member axis.

10. The method of making the rotor of an axial air gap dynamo electric machine which comprises, forming a generally cylindrical rotor body, forming on an end face thereof a generally annular pole piece receiving channel bounded on one side thereof by a lip undercut on its inner side and bounded on the other side thereof by an upstanding ridge, forming a plurality of magnet receiving openings through said body member in line with said channel and extending generally lengthwise of the axis of said body member, inserting magnets in said openings, placing pole pieces in said channel over said magnets with one edge of the pole pieces being received under said lip, and pressing said ridge over the opposite edge of said pole pieces.

References Cited in the file of this patent

UNITED STATES PATENTS

| 504,914 | Eldredge | Sept. 12, 1893 |
| 1,359,333 | Cowles | Nov. 16, 1920 |
| 1,953,131 | Reis | Apr. 3, 1934 |
| 2,626,367 | Beymer | Jan. 20, 1953 |
| 2,637,825 | Moore | May 5, 1953 |

FOREIGN PATENTS

| 516,221 | Germany | Jan. 20, 1931 |